United States Patent
Sudou et al.

(10) Patent No.: US 9,588,222 B2
(45) Date of Patent: *Mar. 7, 2017

(54) PRECEDING VEHICLE SELECTION APPARATUS

(71) Applicant: DENSO CORPORATION, Kariya, Aichi-pref. (JP)

(72) Inventors: Takuma Sudou, Kariya (JP); Jin Kurumisawa, Obu (JP); Toyohito Nozawa, Aichi-ken (JP); Tatsuya Namikiri, Seoul (KR)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,831

(22) Filed: Sep. 29, 2014

(65) Prior Publication Data

US 2015/0094942 A1    Apr. 2, 2015

(30) Foreign Application Priority Data

Sep. 30, 2013   (JP) .................................. 2013-204473

(51) Int. Cl.
  *G01S 13/06* (2006.01)
  *B60W 30/12* (2006.01)
  (Continued)

(52) U.S. Cl.
  CPC ........... *G01S 13/06* (2013.01); *B60W 40/072* (2013.01); *G01S 15/931* (2013.01); *G01S 17/023* (2013.01);
  (Continued)

(58) Field of Classification Search
  CPC ..... B60W 40/072; B60W 30/12; G01S 13/06; G01S 15/931; G01S 17/023; G01S 17/42; G01S 17/936; G01S 2013/9325
  (Continued)

(56) References Cited

U.S. PATENT DOCUMENTS 5,510,990 A * 4/1996 Hibino ............... B60K 31/0008
                                                          180/169
5,710,565 A * 1/1998 Shirai ................ B60K 31/0008
                                                          340/903
(Continued)

FOREIGN PATENT DOCUMENTS

JP      2000-235699     8/2000
JP         3427815      5/2003
(Continued)

OTHER PUBLICATIONS

Office Action mailed Sep. 1, 2015, issued in the corresponding Japanese application No. 2013-204473 in Japanese with English translation.

*Primary Examiner* — Fadey Jabr
*Assistant Examiner* — Angelina Shudy
(74) *Attorney, Agent, or Firm* — Harness, Dickey & Pierce, P.L.C.

(57) ABSTRACT

A preceding vehicle selection apparatus estimates a curvature of a road on which an own vehicle is traveling, detects an object ahead of the own vehicle, and determines a relative position in relation to the own vehicle. Based on the curvature and the relative position, an own vehicle lane probability instantaneous value is determined. This instantaneous value is a probability of the object ahead being present in the same vehicle lane as the own vehicle. By a filter calculation on the instantaneous value, an own vehicle lane probability is determined. Based on the own vehicle lane probability, a preceding vehicle is selected. An inter-vehicle time required for the own vehicle to reach a detection position of the object ahead is calculated. Based on the inter-vehicle time, characteristics of the filter calculation are changed such that an effect of the own vehicle lane instantaneous value increases as the inter-vehicle time decreases.

6 Claims, 5 Drawing Sheets

(51) Int. Cl.
*B60W 40/072* (2012.01)
*G01S 15/93* (2006.01)
*G01S 17/02* (2006.01)
*G01S 17/42* (2006.01)
*G01S 17/93* (2006.01)
*G01S 13/93* (2006.01)

(52) U.S. Cl.
CPC ............ *G01S 17/42* (2013.01); *G01S 17/936* (2013.01); *B60W 30/12* (2013.01); *G01S 2013/9325* (2013.01)

(58) Field of Classification Search
USPC ............ 701/300, 94, 96; 340/435, 436, 438; 180/167–171
See application file for complete search history.

(56) References Cited

U.S. PATENT DOCUMENTS

| | | | | |
|---|---|---|---|---|
| 5,798,949 | A * | 8/1998 | Kaub | G08G 1/164 703/6 |
| 6,466,863 | B2 * | 10/2002 | Shirai | B60K 31/0066 180/169 |
| 6,484,087 | B2 * | 11/2002 | Shirai | B60W 30/16 180/169 |
| 6,662,141 | B2 * | 12/2003 | Kaub | G08G 1/164 340/907 |
| 6,889,140 | B2 * | 5/2005 | Isogai | B60K 31/0008 180/167 |
| 6,894,603 | B2 * | 5/2005 | Kim et al. | 370/458 |
| 7,555,367 | B2 * | 6/2009 | Kuge | 701/1 |
| 7,753,153 | B2 * | 7/2010 | Swoboda | B60K 31/0008 180/167 |
| 8,473,144 | B1 * | 6/2013 | Dolgov | B60W 30/095 348/119 |
| 8,738,319 | B2 * | 5/2014 | Yopp | G08G 1/04 340/435 |
| 8,781,644 | B2 * | 7/2014 | Samukawa | B60W 50/14 701/1 |
| 9,114,810 | B2 * | 8/2015 | Sudou | G01S 1/02 |
| 9,250,324 | B2 * | 2/2016 | Zeng | G01S 13/87 |
| 9,412,271 | B2 * | 8/2016 | Sharma | G08G 1/052 |
| 9,421,980 | B2 * | 8/2016 | Sudou | B60W 40/072 |
| 9,423,498 | B1 * | 8/2016 | Brown | G08G 1/16 |
| 2001/0037165 | A1 | 11/2001 | Shirai et al. | |
| 2002/0003489 | A1 * | 1/2002 | Samukawa | G01S 17/42 342/70 |
| 2004/0016870 | A1 * | 1/2004 | Pawlicki | H04N 5/247 250/208.1 |
| 2004/0117090 | A1 * | 6/2004 | Samukawa et al. | 701/45 |
| 2004/0140143 | A1 | 7/2004 | Saeki et al. | |
| 2004/0199327 | A1 * | 10/2004 | Isogai et al. | 701/301 |
| 2012/0271483 | A1 * | 10/2012 | Samukawa et al. | 701/1 |
| 2015/0016678 | A1 * | 1/2015 | Imaeda | 382/103 |
| 2015/0100217 | A1 * | 4/2015 | Sudou et al. | 701/96 |
| 2015/0100228 | A1 * | 4/2015 | Sudou | G01S 1/02 701/300 |
| 2015/0112580 | A1 * | 4/2015 | Sudou | B60K 31/0008 701/300 |
| 2016/0061612 | A1 * | 3/2016 | You | G01C 21/26 701/409 |

FOREIGN PATENT DOCUMENTS

| | | |
|---|---|---|
| JP | 2004-217175 A | 8/2004 |
| JP | 2005-250660 A | 9/2005 |
| JP | 2006-056485 | 3/2006 |
| JP | 2009-012496 | 1/2009 |

\* cited by examiner

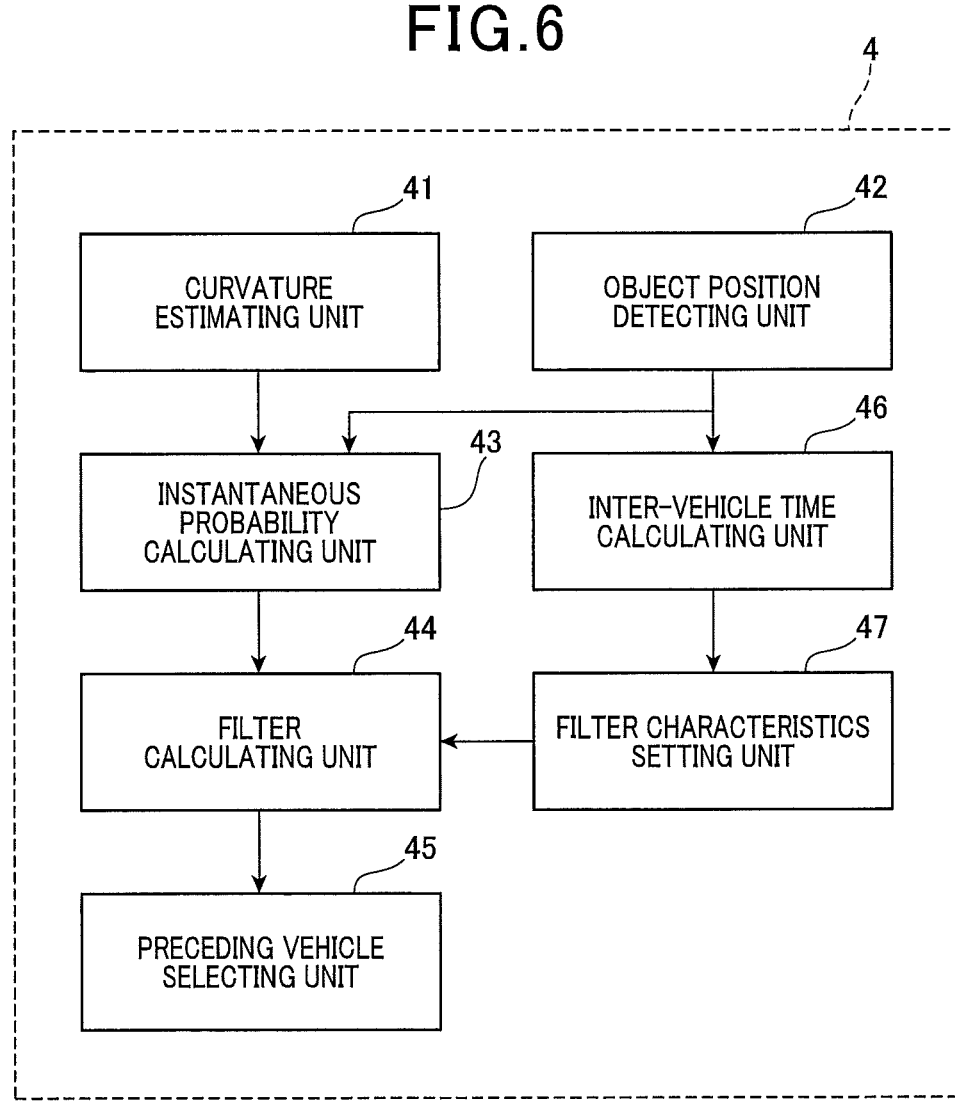

PRECEDING VEHICLE SELECTION APPARATUS

CROSS-REFERENCE TO RELATED APPLICATION

This application is based on and claims the benefit of priority from Japanese Patent Application No. 2013-204473, filed Sep. 30, 2013, the disclosure of which is incorporated herein in its entirety by reference.

BACKGROUND

Technical Field

The present invention relates to a technology for selecting a vehicle (preceding vehicle) that is traveling ahead of an own vehicle.

Related Art

As a technology for reducing operating load placed on a driver who is driving a vehicle, an inter-vehicle control apparatus is known. The inter-vehicle control apparatus detects a vehicle (preceding vehicle) that is traveling ahead of the own vehicle. The inter-vehicle control apparatus controls the vehicle speed and the like to maintain a certain distance between the own vehicle and the preceding vehicle, enabling the own vehicle to automatically track the preceding vehicle.

In this type of apparatus, an estimated curve radius of the road on which the own vehicle is traveling is determined based on the yaw rate and vehicle speed of the own vehicle. In addition, a radar apparatus or the like is used to detect the position of the vehicle that is present ahead of the own vehicle. Based on the estimated curve radius and the position of the preceding vehicle, an own vehicle lane probability is determined for each detected preceding vehicle. The own vehicle lane probability indicates the probability of the vehicle being present in the same lane as the estimated traveling road of the own vehicle. Selection of a preceding vehicle and cancellation of the selection are performed based on the own vehicle lane probability.

However, because the detection values of the yaw rate vary, the calculation results for the estimated curve radius also vary. Therefore, to suppress the effects caused by the variation, a filter calculation is performed on the own vehicle lane probability.

Furthermore, at close distances, it is preferable that the filter be weak to ensure responsiveness, so that responses can be quickly made regarding merging vehicles and the like. However, at long distances, error in the estimated traveling road determined based on the estimated curve radius increases. When the value of the own vehicle lane probability significantly changes in accompaniment, a phenomenon occurs in which the preceding vehicle is frequently set and canceled. Therefore, it is preferable that the filter be strong to ensure stability of the own vehicle lane probability. As a result, a filter coefficient is also changed depending on the inter-vehicle distance (refer to, for example, JP-B-3427815).

However, whether the driver senses the inter-vehicle distance to be long or short differs depending on the vehicle speed. Therefore, in the conventional method of changing the filter characteristics based on the inter-vehicle distance, a problem occurs in that suitable filter characteristics cannot be actualized at every vehicle speed.

In other words, when the filter is set so as to become stronger near the inter-vehicle distance of 80 m, this setting is suited to the senses of the driver during low-speed cruising. However, the timing at which the filter strengthens is too early during high-speed cruising. Therefore, the driver senses that detection of a merging vehicle, for which responsiveness is required, becomes slow during high-speed cruising.

SUMMARY

It is thus desired to provide a technology in which a preceding vehicle is selected at a timing suited to the senses of a driver, regardless of vehicle speed.

An exemplary embodiment provides a preceding vehicle selection apparatus that includes curvature estimating means, object position detecting means, instantaneous probability calculating means, filter calculating means, preceding vehicle selecting means, inter-vehicle time calculating means, and filter characteristics setting means.

The curvature estimating means estimates a curvature of a traveling road on which the own vehicle is traveling. The object position detecting means detects an object ahead. The object ahead is an object present ahead of the own vehicle. The object position detecting means determines a relative position in relation to the own vehicle, for each object ahead. The instantaneous probability calculating means repeatedly determines an own vehicle lane probability instantaneous value for each object ahead, based on the estimated curvature estimated by the curvature estimating means and the relative position determined by the object position detecting means. The own vehicle lane probability instantaneous value is an instantaneous value of a probability of the object ahead being present in the same vehicle lane as the own vehicle. The filter calculating means determines an own vehicle lane probability by performing a filter calculation on the own vehicle lane probability instantaneous value calculated by the instantaneous probability calculating means. The preceding vehicle selecting means selects a preceding vehicle based on the own vehicle lane probability determined by the filter calculating means.

The inter-vehicle time calculating means calculates an inter-vehicle time for each object ahead. The inter-vehicle time indicates a time required for the own vehicle to reach a detected position of the object ahead. The filter characteristics setting means changes characteristics of filter calculation such that an effect of the own vehicle lane instantaneous value increases as the inter-vehicle time decreases, based on the inter-vehicle time determined by the inter-vehicle time calculating means.

In the preceding vehicle selection apparatus of the present invention configured as described above, the characteristics of filter calculation change based on the inter-vehicle time. Therefore, filter calculation that takes into consideration various characteristics (such as the characteristic of an estimated curve radius) that change depending on the own vehicle speed can be actualized. As a result, the preceding vehicle can be selected at the timing suited to the senses of the driver at all vehicle speeds (in other words, regardless of the vehicle speed).

In addition, the present invention can be actualized by various embodiments in addition to the above-described preceding vehicle selection apparatus. For example, the present invention can be actualized by a system of which the preceding vehicle selection apparatus is a constituent element, or a program enabling a computer to function as each means configuring the preceding vehicle selection apparatus.

BRIEF DESCRIPTION OF THE DRAWINGS

In the accompanying drawings:

FIG. 6 is a block diagram showing a functional configuration of the inter-vehicle controller shown in FIG. 1.

DESCRIPTION OF THE EMBODIMENTS

An embodiment to which the present invention is applied will hereinafter be described with reference to the drawings.

Figure 1:
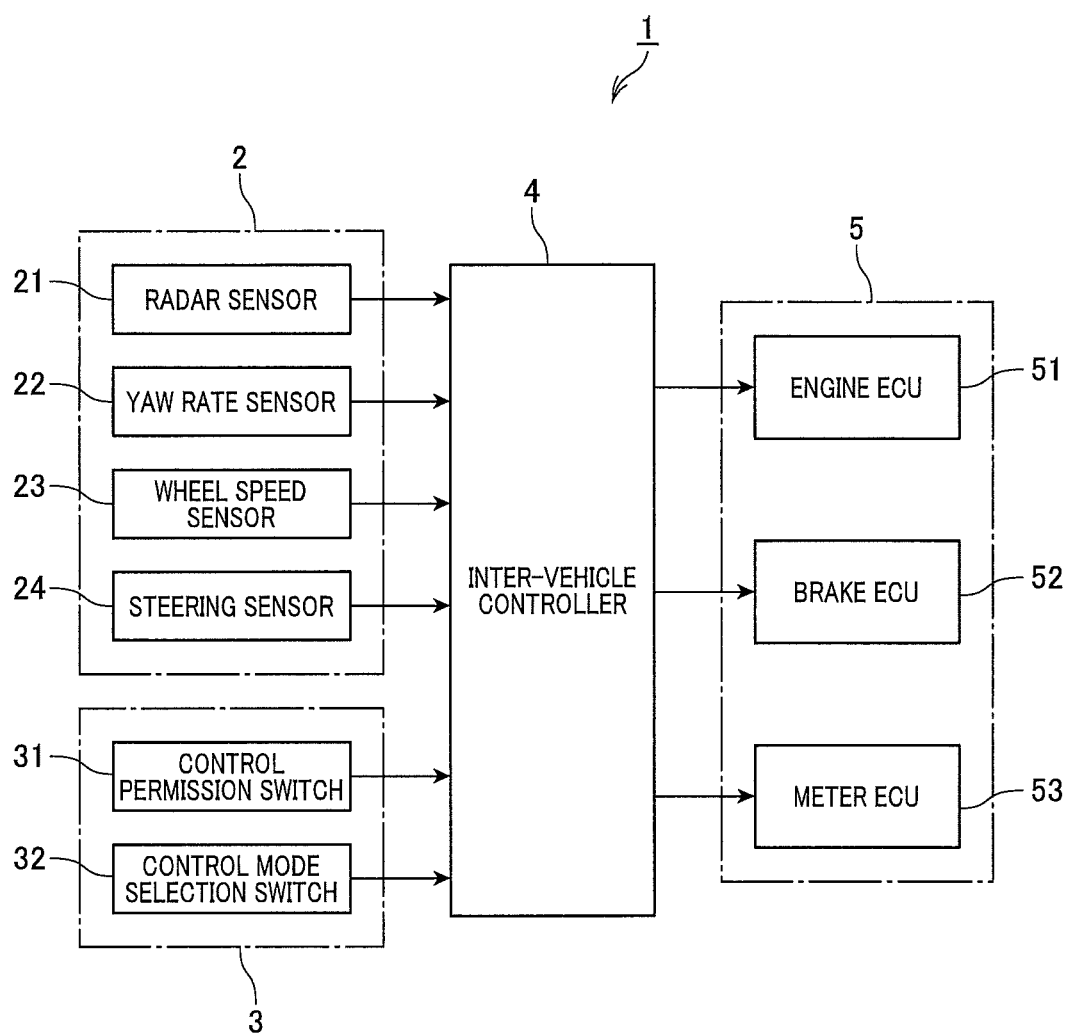
FIG. 1 is a block diagram showing an overall configuration of an inter-vehicle control system including an inter-vehicle controller that is applicable to a preceding vehicle selection apparatus according to an embodiment.

As shown in FIG. 1, an inter-vehicle control system 1 is mounted in an automobile. The inter-vehicle control system 1 controls the vehicle speed to maintain the inter-vehicle distance to a vehicle (preceding vehicle) traveling ahead of the own vehicle at a suitable distance.

The inter-vehicle control system 1 is mainly configured by an inter-vehicle controller 4 that works as a preceding vehicle selection apparatus according to the embodiment. The inter-vehicle control system 1 also includes a sensor group 2, a switch group 3, and an electronic control unit (ECU) group 5. The sensor group 2 is composed of various sensors used to detect the situation surrounding the vehicle, as well as the behavior and state of the vehicle. The switch group 3 is composed of various switches used to input instructions to the inter-vehicle controller 4. The ECU group 5 performs various control operations based on commands from the inter-vehicle controller 4.

The sensor group 2 includes at least a radar sensor 21, a yaw rate sensor 22, a wheel speed sensor 23, and a steering sensor 24.

The radar sensor 21 outputs laser light towards the area ahead of the own vehicle so as to scan a predetermined angle range. The radar sensor 21 also detects reflected light of the laser light. The radar sensor 21 determines the distance to an object that has reflected the laser light based on the amount of time required for the laser light to reach and return from the object. In addition, the radar sensor 21 determines the direction in which the object is present based on the direction in which the laser light is irradiated when the reflected light is detected. The radar sensor 21 is not limited that which uses laser light. The radar sensor 21 may use millimeter waveband or micro-millimeter waveband radio waves, ultrasonic waves, or the like.

The yaw rate sensor 22 outputs signals based on the yaw rate of the vehicle.

The wheel speed sensor 23 is attached to each of the left front wheel, the right front wheel, the left rear wheel, and the right rear wheel. Each wheel speed sensor 23 outputs a pulse signal having an edge (pulse edge) that is formed at every predetermined angle depending on the rotation of the wheel shaft. In other words, the wheel speed sensor 23 outputs a pulse signal having a pulse interval based on the rotation speed of the wheel shaft.

The steering sensor 24 outputs signals based on a relative steering angle of the steering wheel (amount of change in the steering angle) or an absolute steering angle of the steering wheel (actual steering angle with reference to the steering position when the vehicle traveling straight ahead).

The switch group 3 includes at least a control permission switch 31 and a control mode selection switch 32.

The control permission switch 31 is used to input whether or not execution of adaptive cruise control (ACC) is permitted. ACC is a known control operation that enables the vehicle to travel at a predetermined set speed when a preceding vehicle is not present. ACC performs tracking cruise in which a predetermined inter-vehicle distance is maintained when a preceding vehicle is present.

The control mode selection switch 32 is used to select ACC control mode.

The ECU group 5 includes at least an engine ECU 51, a brake ECU 52, and a meter ECU 53.

The engine ECU 51 controls engine start/stop, fuel injection amount, ignition timing, and the like. The engine ECU 51 includes a central processing unit (CPU), a read-only memory (ROM), a random access memory (RAM), and the like. Specifically, the engine ECU 51 controls a throttle ACT based on detection values from a sensor that detects the depression amount of an accelerator pedal. The throttle ACT is an actuator that opens and closes a throttle provided in an air intake pipe. In addition, the engine ECU 51 controls the throttle ACT to increase and decrease the driving force of an internal combustion engine based on instructions from the inter-vehicle controller 4.

The brake ECU 52 controls braking of the own vehicle. The brake ECU 52 includes a CPU, a ROM, a RAM, and the like. Specifically, the brake ECU 52 controls a brake ACT based on detection values from a sensor that detects the depression amount of a brake pedal. The brake ACT is an actuator that opens and closes a pressure-increase regulating valve and a pressure-decrease regulating valve provided in a hydraulic brake circuit. In addition, the brake ECU 52 controls the brake ACT to increase and decrease braking force of the own vehicle based on instructions from the inter-vehicle controller 4.

The meter ECU 53 performs is display control of a meter display that is provided in the vehicle, based on instructions from each unit of the vehicle including the inter-vehicle controller 4. The meter ECU 53 includes a CPU, a ROM, a RAM, and the like. Specifically, the meter ECU 53 displays, in the meter display, vehicle speed, engine rotation speed, and the execution state and control mode of control performed by the inter-vehicle controller 4.

The inter-vehicle controller 4 is mainly configured by a known microcomputer that includes a CPU, a ROM, a RAM, and the like. In addition, the inter-vehicle controller 4 includes a detection circuit, an analog/digital (A/D) conversion circuit, an input/output (I/O) interface, a communication circuit, and the like. The detection circuit and the A/D conversion circuit detect signals outputted from the sensor group 2 and convert the signals to digital values. The I/O interface receives input from the switch group 3. The communication circuit communicates with the ECU group 5. These hardware configurations are common. Therefore, detailed descriptions thereof are omitted.

In the inter-vehicle controller 4, the CPU executes one or more programs stored in advance in the memory (e.g., ROM) to perform a predetermined preceding vehicle determination process as described in detail below. Thus, as shown in FIG. 6, the inter-vehicle controller 4 is capable of working as the preceding vehicle selection apparatus that includes a curvature estimating unit 41 (equivalent to curvature estimating means), an object position detecting unit 42 (equivalent to object position detecting means), an instantaneous probability calculating unit 43 (equivalent to instantaneous probability calculating means), a filter calculating unit 44 (equivalent to filter calculating means), a preceding vehicle selecting unit 45 (equivalent to preceding vehicle selecting means), an inter-vehicle time calculating unit 46 (equivalent to inter-vehicle time calculating means), and a filter characteristics setting unit 47 (equivalent to filter characteristics setting means).

When ACC is permitted by the control permission switch 31, the inter-vehicle controller 4 periodically (such as every 100 ms) performs a preceding vehicle determination process. In addition, the inter-vehicle controller 4 performs an inter-vehicle control process selected by the control mode selection switch 32 using the determination result of the preceding vehicle determination process.

Of the processes, in the inter-vehicle control process, the inter-vehicle controller 4 ordinarily controls the vehicle speed by outputting instructions to increase and decrease the accelerator operation amount to the engine ECU 51. When control cannot be supported using the accelerator operation amount, the inter-vehicle controller 4 restricts the vehicle speed by outputting a brake command to the brake ECU 52. In addition, the inter-vehicle controller 4 outputs, to the meter ECU 53, various pieces of ACC-related display information and commands for generating an alert when predetermined conditions are met.

Figure 2:
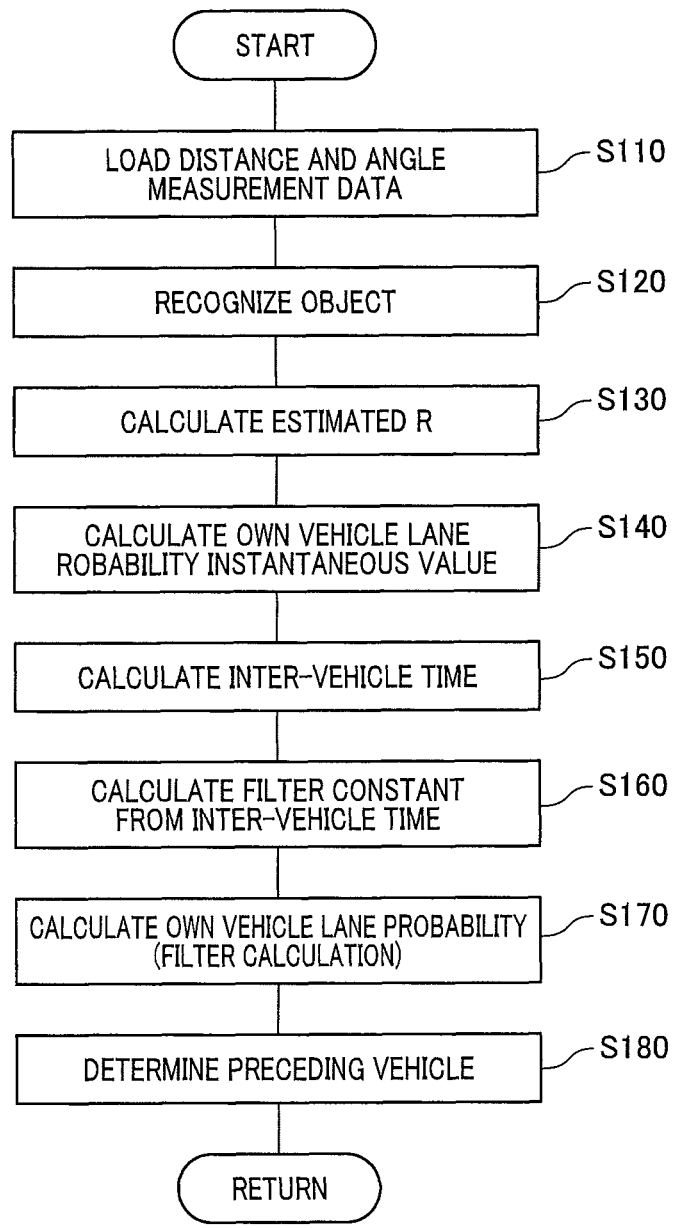
FIG. 2 is a flowchart of a preceding vehicle selection process performed by the inter-vehicle controller shown in FIG. 1.

Here, details of the preceding vehicle determination process performed by the inter-vehicle controller 4 will be described with reference to the flowchart shown in FIG. 2. In the embodiment, a program that enables the CPU of the inter-vehicle controller 4 to perform the preceding vehicle determination process shown in FIG. 2 is stored in the memory (e.g., ROM) of the inter-vehicle controller 4 in advance.

When the preceding vehicle determination process is started, first, at step S110, the inter-vehicle controller 4 loads the distance and angle measurement data detected by the radar sensor 21.

At subsequent step S120, the inter-vehicle controller 4 converts the loaded distance and angle measurement data, from the polar coordinate system expressed by the data to an orthogonal coordinate system. Based on the converted data, the inter-vehicle controller 4 performs an object recognition process to recognize an object that is present ahead of the own vehicle. In the object recognition process, the inter-vehicle controller 4 clusters the distance and angle measurement data. The inter-vehicle controller 4 then determines the center position coordinates of the object, the relative speed to the own vehicle, and the like for each cluster. The object recognized herein is referred to, hereinafter, as a "target". The inter-vehicle controller 4 performs the processing operation at step S120, and then is capable of working as the object position detecting unit 42 in FIG. 6.

At subsequent step S130, based on the yaw rate γ detected by the yaw rate sensor 22 and the own vehicle speed V calculated based on the detection results from the wheel speed sensors 23, an estimated R is calculated based on the following expression (1). The estimated R is the curve radius (reciprocal of the curvature) of an own vehicle traveling curve. The inter-vehicle controller 4 performs the processing operation at step S130, and then is capable of working as the curvature estimating unit 41 in FIG. 6.

$$R = \frac{V}{\gamma} \quad (1)$$

At subsequent step S140, the inter-vehicle controller 4 calculates an own vehicle lane probability instantaneous value of the object recognized at step S120. The own vehicle lane probability is a parameter indicating the likelihood of the target being a vehicle that is traveling in the same lane as the own vehicle. The own vehicle lane probability instantaneous value is an instantaneous value of the own vehicle lane probability calculated based on detection data in the current processing cycle.

In this process, first, the inter-vehicle controller 4 determines the positions of all targets obtained at step S120 (object recognition process) as positions converted under a premise that the traveling road on which the own vehicle is traveling is a straight road. The inter-vehicle controller 4 uses the estimated R calculated at step S130 to determine the positions of all targets. Then, for each target, the inter-vehicle controller 4 determines the own vehicle lane probability instantaneous value from the converted position of the target using an own vehicle lane probability map that is set in advance.

The own vehicle lane probability map is a known map in which the probability tends to be the highest when the converted position is near the front of the own vehicle and at a close distance. In addition, the probability tends to decrease as the converted position becomes farther and shifted in the lateral direction from the front of the own vehicle. A specific example and usage of the own vehicle lane probability map are described in detail in JP-B-3427815 and the like. A reason for expressing whether or not the target is in the own vehicle lane in terms of probability is that an error is present between the curve radius of curvature (estimated R) determined from the yaw rate and the actual curve radius of curvature. The inter-vehicle controller 4 performs the processing operation at step S140, and then is capable of working as the instantaneous probability calculating unit 43 in FIG. 6.

At subsequent step S150, the inter-vehicle controller 4 calculates an inter-vehicle time for each target. The inter-vehicle time can be determined by dividing the distance to the target by the own vehicle speed. The inter-vehicle controller 4 performs the processing operation at step S150, and then is capable of working as the inter-vehicle time calculating unit 46 in FIG. 6.

Figure 3:
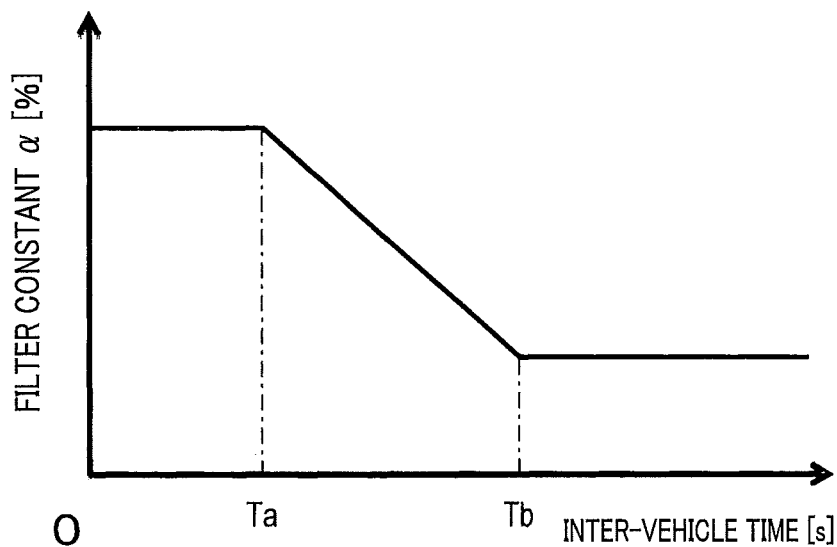
FIG. 3 is a graph showing details of a filter constant table that is used to calculate a filter constant from an inter-vehicle time at step S160 shown in FIG. 2.

At subsequent step S160, the inter-vehicle controller 4 determines a filter constant α from the inter-vehicle time for each target. The inter-vehicle controller 4 uses a filter constant table that is set in advance to determine the filter constant. As shown in FIG. 3, the filter constant table is set so that the filter constant is an upper limit value when the inter-vehicle time is less than a close distance threshold Ta. The filter constant is a lower limit value when the inter-vehicle time is greater than a long distance threshold Tb. When the inter-vehicle time is the close distance threshold Ta or greater and the long distance threshold Tb or less, the filter constant is set to decrease from the upper limit value to the lower limit value in proportion with the increase in inter-vehicle time. The inter-vehicle controller 4 performs the processing operation at step S160, and then is capable of working as the filter characteristics setting unit 47 in FIG. 6.

At subsequent step S170, the inter-vehicle controller 4 uses the determined filter constant α and performs a filter process using the following expression (2) for each processing cycle. In other words, the inter-vehicle controller 4 calculates a weighted average value using a weight that is the filter constant α. The inter-vehicle controller 4 thereby calculates the own vehicle lane probability used for determination of the preceding vehicle.

Here, the own vehicle lane probability to be determined in a present processing cycle is represented by P(t) (i.e., a present value of the own vehicle lane probability). The own vehicle lane probability determined in a previous processing cycle is represented by P(t−1) (i.e., a previous value of the own vehicle lane probability). The own vehicle lane probability instantaneous value determined at step S140 is represented by Pc.

$$P(t) = Pc \times \frac{\alpha}{100} + P(t-1) \times \left(1 - \frac{\alpha}{100}\right) \quad (2)$$

In other words, the filter process works as a so-called low pass filter. As α increases, or in other words, as the inter-vehicle time decreases, the filter becomes weaker (favorable responsiveness). The own vehicle lane probability instantaneous value Pc is more easily reflected in the own vehicle lane probability P(t). As α decreases, or in other words, as the inter-vehicle time increases, the filter becomes stronger (high stability). The own vehicle lane probability instantaneous value Pc is less easily reflected in the own vehicle lane probability P(t). The inter-vehicle controller 4 performs the processing operation at step S170, and then is capable of working as the filter calculating unit 44 in FIG. 6.

At subsequent step S180, the inter-vehicle controller 4 determines the preceding vehicle based on the own vehicle lane probability P(t) calculated at step S170. The inter-vehicle controller 4 then ends the process. Specifically, for example, the inter-vehicle controller 4 determines a target having the shortest distance to the own vehicle, among the targets of which the own vehicle lane probability P(t) is a threshold (such as 50%) or higher, as the preceding vehicle.

The inter-vehicle controller 4 performs the inter-vehicle control process based on the distance to the target determined to be the preceding vehicle by the preceding vehicle determination process, and the relative speed of the target. The inter-vehicle controller 4 outputs various commands to the ECU group 5. The inter-vehicle controller 4 performs the processing operation at step S180, and then is capable of working as the preceding vehicle selecting unit 45 in FIG. 6.

Figure 4:
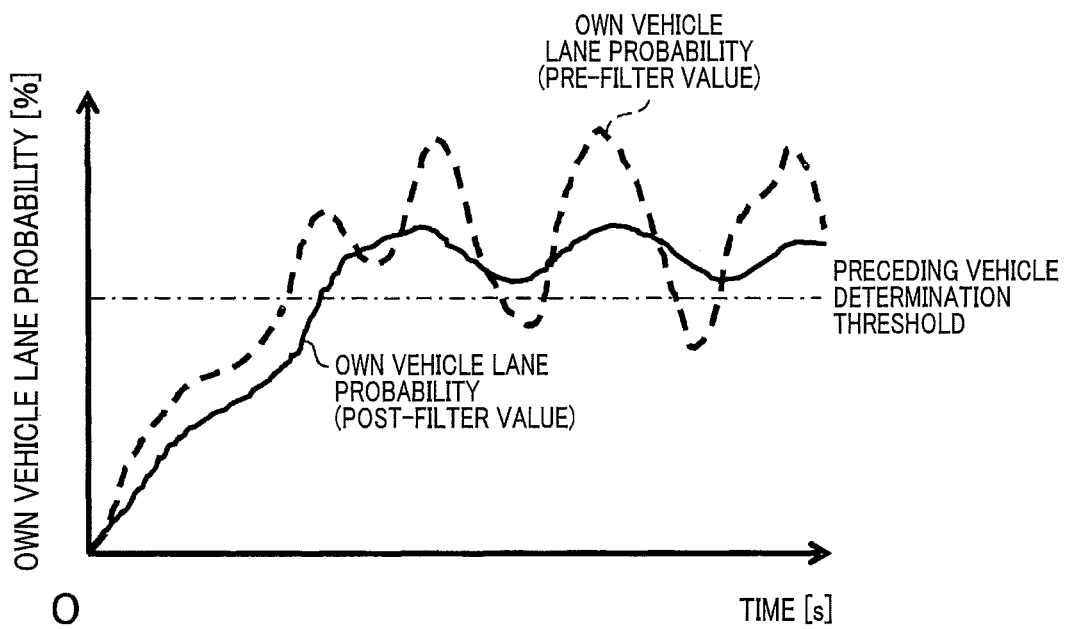
FIG. 4 is a graph showing changes in an own vehicle lane probability before and after a filter process performed by the inter-vehicle controller shown in FIG. 1.

As described above, in the inter-vehicle control system 1, filter calculation is performed on the own vehicle lane probability instantaneous value Pc when the own vehicle lane probability P(t) is calculated. The own vehicle lane probability P(t) is used for preceding vehicle determination. Therefore, as shown in FIG. 4, variations in the own vehicle lane probability P(t) are suppressed in comparison to the own vehicle lane probability instantaneous value Pc. As a result, frequent changing of the determination results of the preceding vehicle determination can be prevented.

In addition, the filter characteristics are changed depending on the inter-vehicle time. The filter becomes stronger when the inter-vehicle time increases. The filter becomes weaker when the inter-vehicle time decreases. Therefore, for long distances in which the own vehicle lane probability tends to become unstable, the own vehicle lane probability is stabilized. As a result, stable selection of the preceding vehicle can be actualized. For close distances in which the own vehicle lane probability is relatively stable, favorably responsive selection of the preceding vehicle can be actualized.

As shown in FIG. 4, variations in the value of the own vehicle lane probability P(t) after the filter calculation are actually suppressed in comparison to the own vehicle lane probability instantaneous value Pc before the filter calculation. As a result, it is clear that frequent changing of the determination result of the preceding vehicle determination is suppressed.

In addition, in the inter-vehicle control system 1, the filter characteristics are changed based on the inter-vehicle time. Therefore, unlike when the filter characteristics are changed based on the inter-vehicle distance, the preceding vehicle can be selected at a timing suited to the senses of the driver, at all vehicle speeds (in other words, regardless of the vehicle speed). Inter-vehicle control using the preceding vehicle that has been selected at the suitable timings can be actualized at favorable timings.

Figure 5:
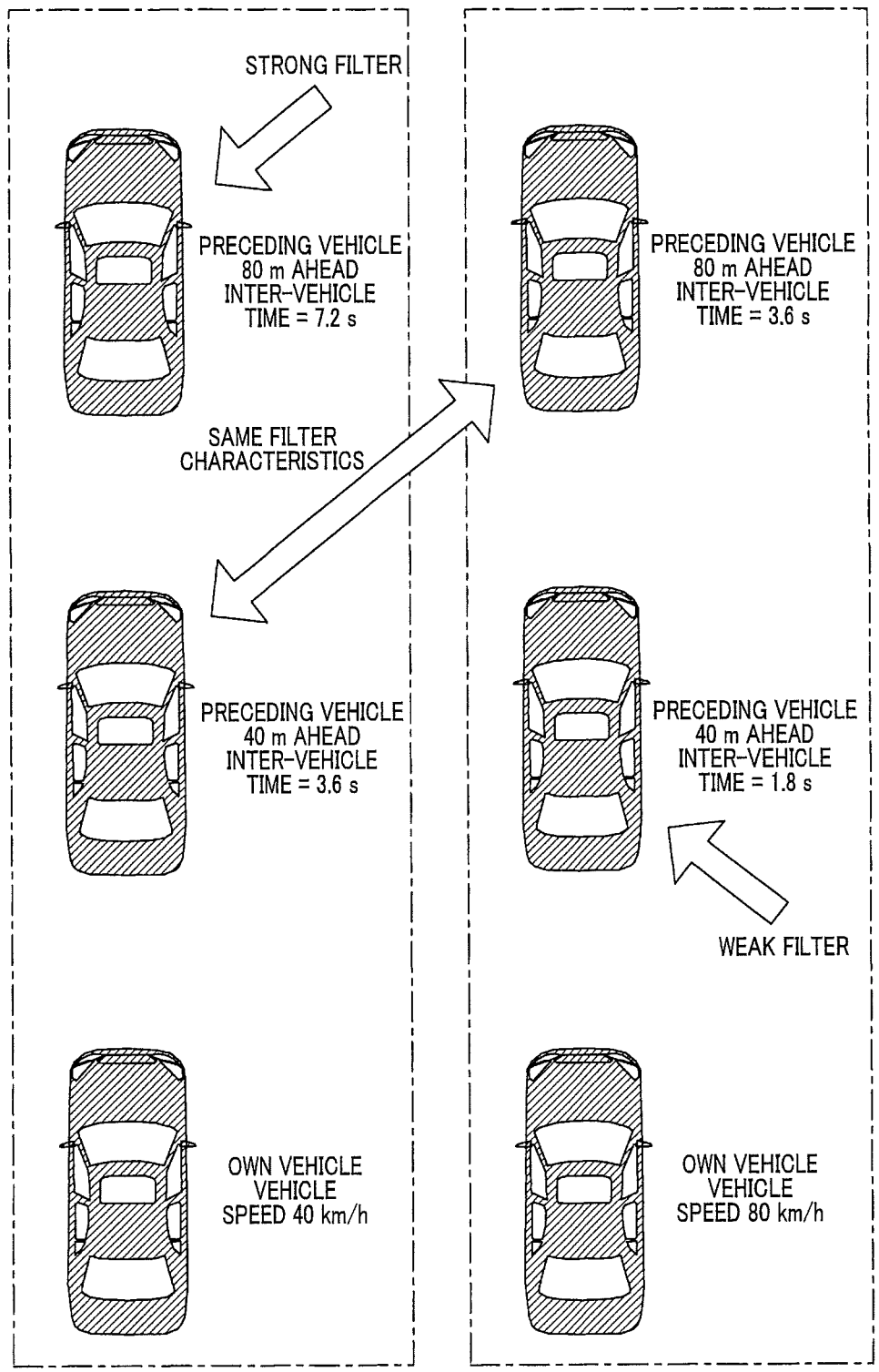
FIG. 5 is an explanatory diagram effects achieved by the filter constant being changed depending on the inter-vehicle time in the embodiment.

In other words, as the own vehicle speed increases, the inter-vehicle distance to the preceding vehicle that feels dangerous becomes shorter. Therefore, in conventional apparatuses that change the filter based on the inter-vehicle distance, when the filter is set to suit the senses of the driver at low speeds, the driver may sense that the timing for determining a merging vehicle to be a preceding vehicle is slow (control responsiveness is poor) at high speeds. Conversely, as shown in FIG. 5, in the inter-vehicle control system 1 in which the filter is changed based on the inter-vehicle time, the distance at which the filter weakens (responsiveness of the determination becomes favorable) changes based on the vehicle speed. Therefore, determination at the timing suited to the driver can be actualized regardless of the vehicle speed.

Other Embodiments

An embodiment of the present invention is described above. However, the present invention is not limited to the above-described embodiment. It goes without saying that various embodiments are possible.

(1) According to the above-described embodiment, the estimated R is calculated from the yaw rate detected by the yaw rate sensor. However, the estimated R may be calculated from the steering angle detected by the steering sensor.

(2) According to the above-described embodiment, an example is given in which the present invention is applied to an inter-vehicle control system. However, this is not limited thereto. The present invention may be applied to any system as long as the system sets a preceding vehicle and performs control of some kind based on the state of the preceding vehicle or the relative state between the preceding vehicle and the own vehicle.

(3) The constituent elements of the present invention are conceptual and are not limited to those according to the present embodiment. For example, functions provided by a single constituent element may be dispersed among a plurality of constituent elements. Alternatively, the functions of a plurality of constituent elements may be integrated in a single constituent element. In addition, at least some of the configurations according to the above-described embodiment may be replaced with a known configuration having similar functions. In addition, at least some of the configurations according to the above-described embodiment may, for example, be added to or substituted for other configurations according to the above-described embodiment.

What is claimed is:

1. A preceding vehicle selection apparatus comprising:
    curvature estimating means that estimates a curvature of a traveling road on which an own vehicle is traveling;
    object position detecting means that detects an object ahead of the own vehicle, and determines a relative position in relation to the own vehicle, for each object ahead;
    instantaneous probability calculating means that repeatedly determines an own vehicle lane probability instantaneous value for each object ahead, based on the estimated curvature estimated by the curvature estimating means and the relative position determined by the object position detecting means, the own vehicle lane probability instantaneous value being an instantaneous value of a probability of the object ahead being present in the same vehicle lane as the own vehicle;
    filter calculating means that determines an own vehicle lane probability by performing a filter calculation on the own vehicle lane probability instantaneous value calculated by the instantaneous probability calculating means;
    preceding vehicle selecting means that selects a preceding vehicle based on the own vehicle lane probability determined by the filter calculating means;
    inter-vehicle time calculating means that calculates an inter-vehicle time for each object ahead, the inter-vehicle time indicating a time required for the own vehicle to reach a detected position of the object ahead; and
    filter characteristics setting means that changes characteristics of the filter calculation such that an effect of the own vehicle lane instantaneous value increases as the inter-vehicle time decreases, based on the inter-vehicle time determined by the inter-vehicle time calculating means, wherein:
    the filter calculating means determines a present value of the own vehicle lane probability in a present processing cycle by performing the filter calculation to calculate, using a weight, a weighted average of (i) the own vehicle lane probability instantaneous value and (ii) a previous value of the own vehicle lane probability determined in a previous processing cycle by the filter calculating means, and changes the weight for calculating the weighted average based on the inter-vehicle time; and
    the own vehicle lane probability is determined by $$P(t) = Pc \times \frac{\alpha}{100} + P(t-1) \times \left(1 - \frac{\alpha}{100}\right)$$

where:
    P(t) is the present value of the own vehicle lane probability that is determined in a present processing cycle;
    P(t−1) is the previous value of the own vehicle lane probability that is determined in a previous processing cycle;
    Pc is the own vehicle lane probability instantaneous value; and
    α is a filter constant that is the weight for calculating the weighted average.

2. The preceding vehicle selection apparatus according to claim 1, wherein:
    the filter constant is set to an upper limit value when the inter-vehicle time is less than a predetermined first threshold for a close distance;
    the filter constant is set to a lower limit value when the inter-vehicle time is greater than a predetermined second threshold for a long distance; and
    the filter constant is set to decrease from the upper limit value to the lower limit value in proportion with an increase in the inter-vehicle time, when the inter-vehicle time is the first threshold or greater and the second threshold or less.

3. The preceding vehicle selection apparatus according to claim 2, wherein
    the curvature of the traveling road is estimated by $$R = \frac{V}{\gamma}$$

where:
    R is a curve radius that is a reciprocal of the curvature of the traveling road;
    V is a speed of the own vehicle; and
    γ is a yaw rate of the own vehicle.

4. A preceding vehicle selection method comprising:
    estimating a curvature of a traveling road on which an own vehicle is traveling;
    detecting an object present ahead of the own vehicle, and determining a relative position in relation to the own vehicle, for each object ahead;
    repeatedly determining an own vehicle lane probability instantaneous value for each object ahead, based on the estimated curvature and the determined relative position, the own vehicle lane probability instantaneous value being an instantaneous value of a probability of the object ahead being present in the same vehicle lane as the own vehicle;
    determining an own vehicle lane probability by performing a filter calculation on the calculated own vehicle lane probability instantaneous value;
    selecting a preceding vehicle based on the determined own vehicle lane probability;
    calculating an inter-vehicle time for each object ahead, the inter-vehicle time indicating a time required for the own vehicle to reach a detected position of the object ahead; and
    changing characteristics of the filter calculation such that an effect of the own vehicle lane instantaneous value increases as the inter-vehicle time decreases, based on the determined inter-vehicle time, wherein
    a present value of the own vehicle lane probability in a present processing cycle is determined by performing the filter calculation to calculate, using a weight, a weighted average of (i) the own vehicle lane probability instantaneous value and (ii) a previous value of the own vehicle lane probability that is determined in a previous processing cycle;
    the weight for calculating the weighted average is changed based on the inter-vehicle time; and
    the own vehicle lane probability is determined by $$P(t) = Pc \times \frac{\alpha}{100} + P(t-1) \times \left(1 - \frac{\alpha}{100}\right)$$

where:
- P(t) is the present value of the own vehicle lane probability that is determined in a present processing cycle;
- P(t−1) is the previous value of the own vehicle lane probability that is determined in a previous processing cycle;
- Pc is the own vehicle lane probability instantaneous value; and
- α is a filter constant that is the weight for calculating the weighted average.

5. The preceding vehicle selection method according to claim 4, wherein:
   the filter constant is set to an upper limit value when the inter-vehicle time is less than a predetermined first threshold for a close distance;
   the filter constant is set to a lower limit value when the inter-vehicle time is greater than a predetermined second threshold for a long distance; and
   the filter constant is set to decrease from the upper limit value to the lower limit value in proportion with an increase in the inter-vehicle time, when the inter-vehicle time is the first threshold or greater and the second threshold or less.

6. The preceding vehicle selection method according to claim 5, wherein
   the curvature of the traveling road is estimated by $$R = \frac{V}{\gamma}$$

where:
- R is a curve radius that is a reciprocal of the curvature of the traveling road;
- V is a speed of the own vehicle; and
- γ is a yaw rate of the own vehicle.

* * * * *